US012611902B2

(12) United States Patent
Nakamura et al.

(10) Patent No.: US 12,611,902 B2
(45) Date of Patent: Apr. 28, 2026

(54) SUSPENSION STRUCTURE FOR VEHICLE AND METHOD OF MANUFACTURING THE SAME

(71) Applicant: YOROZU CORPORATION, Yokohama (JP)

(72) Inventors: Toshikazu Nakamura, Yokohama (JP); Takuto Takase, Yokohama (JP); Ayumi Nakamura, Yokohama (JP)

(73) Assignee: YOROZU CORPORATION, Kanagawa (JP)

( * ) Notice: Subject to any disclaimer, the term of this patent is extended or adjusted under 35 U.S.C. 154(b) by 0 days.

(21) Appl. No.: 18/880,093

(22) PCT Filed: Jul. 4, 2022

(86) PCT No.: PCT/JP2022/026575
§ 371 (c)(1),
(2) Date: Dec. 30, 2024

(87) PCT Pub. No.: WO2024/009345
PCT Pub. Date: Jan. 11, 2024

(65) Prior Publication Data
US 2025/0381813 A1 Dec. 18, 2025

(51) Int. Cl.
B60G 7/00 (2006.01)
(52) U.S. Cl.
CPC ...... B60G 7/001 (2013.01); *B60G 2204/4302* (2013.01); *B60G 2206/124* (2013.01); *B60G 2206/81* (2013.01)
(58) Field of Classification Search
CPC ...... B62K 25/286; B62K 25/20; B62K 25/30; B62K 25/04; B62K 19/30; F16F 9/3207;
(Continued)

(56) References Cited

U.S. PATENT DOCUMENTS 8,690,176 B2 * 4/2014 Perry ..................... B21D 53/88
280/124.134
10,543,726 B2 1/2020 El-Bkaily et al.
(Continued)

FOREIGN PATENT DOCUMENTS

JP 5-16628 A 1/1993
JP H05112111 A * 5/1993 ............. B60G 7/005
(Continued)

OTHER PUBLICATIONS

Translation of JP 2000211329 A.*
(Continued)

*Primary Examiner* — Paul N Dickson
*Assistant Examiner* — Shams Dhanani
(74) *Attorney, Agent, or Firm* — LUCAS & MERCANTI, LLP

(57) ABSTRACT

A suspension structure for vehicle includes a first plate, a second plate, and a first connecting portion. The first plate includes a flange portion which is bent with respect to a first flat plate portion. The flange portion of the first plate is overlaid on and bonded to a second body portion of the second plate. A portion facing the first flat plate portion in the first plate is open, and a first mounting surface is formable by press working in a single state with the bent first flat plate portion. A portion facing a second flat plate portion in the second plate is also open. The connecting portion is constructed by bringing the first flat plate portion and the second flat plate portion face-to-face with each other with a space between the first and second flat plate portions and spacing the first mounting surface and a second mounting surface.

13 Claims, 7 Drawing Sheets

(58) Field of Classification Search

CPC ................. F16F 3/0876; F16F 2228/08; F16F 2230/007; F16F 9/54

See application file for complete search history.

(56) References Cited

U.S. PATENT DOCUMENTS

| | | | | |
|---|---|---|---|---|
| 12,097,743 | B2 * | 9/2024 | Tamura | ................... B60G 7/00 |
| 2009/0102153 | A1 | 4/2009 | Jung | |

FOREIGN PATENT DOCUMENTS

| | | | | |
|---|---|---|---|---|
| JP | H0558407 | U | 8/1993 | |
| JP | 2000211329 | A * | 8/2000 | |
| JP | 3505899 | B2 * | 3/2004 | ............. B60G 7/001 |
| JP | 3705157 | B2 * | 10/2005 | ......... B60G 21/0551 |
| JP | 2010-241259 | A | 10/2010 | |
| WO | 2022/070248 | A1 | 4/2022 | |

OTHER PUBLICATIONS

International Search Report, mailed on Aug. 9, 2022, issued for the corresponding International Application No. PCT/JP2022/026575, 5 pages, with English translation.

Office Action, dated Nov. 11, 2025, which was issued for the corresponding Japanese Patent Application No. 2024-531755, 8 pages, with English translation.

Office Action, dated Jul. 23, 2025, which was issued for the corresponding European Patent Application No. 22950140.8., 9 pages.

* cited by examiner

SUSPENSION STRUCTURE FOR VEHICLE AND METHOD OF MANUFACTURING THE SAME

CROSS REFERENCE TO RELATED APPLICATION

This Application is a 371 of PCT/JP2022/026575 filed on Jul. 4, 2022, which is incorporated herein by reference.

TECHNICAL FIELD

The present invention relates to a suspension structure for vehicle and a method of manufacturing the same.

BACKGROUND ART

A vehicle suspension device has many components, such as a suspension structure for vehicle and a shock absorber. Examples of the suspension structure for vehicle include a suspension arm for vehicle and a suspension member for vehicle. The suspension structure for vehicle has a connecting portion to which components for a vehicle suspension are connected.

For example, a lower arm having generally a shape close to the letter λ in plan view is known as a suspension arm for vehicle which is to be mounted to a vehicle front portion (see Patent Literature 1). The lower arm is a constituent member of a double wishbone type front suspension and has, at each of end portions as two branches of the arm, a connecting portion to which a collar is connected by welding. The collar is a component for a vehicle suspension and swingably connects the lower arm to a vehicle body. The connecting portion is formed from a plurality of wall portions. The connecting portion has a collar mating surface corresponding to a shape of an outer peripheral surface of the collar.

CITATION LIST

Patent Literature

Patent Literature 1: U.S. Pat. No. 10,543,726

SUMMARY OF INVENTION

Technical Problem

Each connecting portion is required to have sufficient rigidity against a force which is input from a tire via a ball joint. A site forming the connecting portion is also a site constrained by a vehicle layout. For this reason, it is difficult to increase a cross-sectional shape of the connecting portion and enhance the rigidity. It is also conceivable to increase thicknesses of the wall portions of the connecting portion for enhancing the rigidity, which however leads to an increase in a component weight and an increase in manufacturing costs.

In the lower arm disclosed in Patent Literature 1, a strut is arranged in the vicinity of each connecting portion in order to enhance the rigidity of the connecting portion.

However, it is necessary to manufacture the strut that is a component different from a body portion of the lower arm and weld-bond the strut to the body portion. This may make a manufacturing process cumbersome and increase the manufacturing costs.

Under the above-described circumstances, an object of the present invention is to provide a suspension structure for vehicle and a manufacturing method for the suspension structure for vehicle capable of enhancing rigidity of a connecting portion without using a different component.

Means for Solving Problem

According to one aspect of the present invention, there is provided a suspension structure for vehicle including at least a first plate and a second plate which are press-formed articles and including a body portion and a connecting portion to which a component for a vehicle suspension is connected. The first plate includes a first body portion which constitutes the body portion, a first flat plate portion which is continuous with a principal surface of the first body portion and is bent and extends with respect to the principal surface, a first mounting surface which is formed at the first flat plate portion and is to come into contact with an outer surface of the component, and a flange portion which is continuous with the first flat plate portion, is bent with respect to the first flat plate portion, and extends toward outside of the principal surface of the first body portion. The second plate includes a second body portion which constitutes the body portion together with the first body portion of the first plate, a second flat plate portion which is continuous with a principal surface of the second body portion and is bent and extends with respect to the principal surface, and a second mounting surface which is formed at the second flat plate portion and is to come into contact with the outer surface of the component. A portion facing the first flat plate portion in the first plate is open such that the first mounting surface is formable by press working in a single state with the bent first flat plate portion. A portion facing the second flat plate portion in the second plate is open such that the second mounting surface is formable by the press working in a single state with the bent second flat plate portion. The body portion is constructed by bringing the first body portion of the first plate and the second body portion of the second plate face-to-face with each other. The connecting portion is constructed by bringing the first flat plate portion of the first plate and the second flat plate portion of the second plate face-to-face with each other with a space between the first flat plate portion and the second flat plate portion and spacing the first mounting surface and the second mounting surface. The flange portion of the first plate is overlaid on and bonded to the second body portion of the second plate.

According to another aspect of the present invention, there is provided a method of manufacturing a suspension structure for vehicle including at least a first plate and a second plate which are press-formed articles and including a body portion and a connecting portion to which a component for a vehicle suspension is connected. In the first plate, a first body portion which constitutes the body portion, a first flat plate portion which is continuous with a principal surface of the first body portion and is bent and extends with respect to the principal surface, and a flange portion which is continuous with the first flat plate portion, is bent with respect to the first flat plate portion, and extends toward outside of the principal surface of the first body portion are formed. A first mounting surface which is to come into contact with an outer surface of the component is formed at the first flat plate portion by press-working the first plate with the bent first flat plate portion while bringing the first plate into contact with a die. In the second plate, a second body portion which constitutes the body portion together with the first body portion of the first plate and a second flat plate portion which is continuous with a principal surface of the second body portion and is bent and extends with respect to the principal surface are formed. A second mounting surface which is to come into contact with the outer surface of the component is formed at the second flat plate portion by press-working the second plate with the bent second flat plate portion while bringing the second plate into contact with the die. The body portion and the connecting portion are formed by putting the first body portion of the first plate and the second body portion of the second plate into a state of being brought face-to-face with each other, bringing the first flat plate portion of the first plate and the second flat plate portion of the second plate face-to-face with each other with a space between the first flat plate portion and the second flat plate portion, spacing the first mounting surface and the second mounting surface, and integrating together the first plate and the second plate by weldbonding in a state where the flange portion of the first plate is overlaid on the second body portion of the second plate.

Advantageous Effect of the Invention

According to the present invention, it is possible to provide a suspension structure for vehicle and a manufacturing method for the suspension structure for vehicle capable of enhancing rigidity of a connecting portion without using a different component.

DESCRIPTION OF EMBODIMENTS

A mode for carrying out the present invention will be described below in detail with reference to the drawings. An embodiment illustrated here is an example for embodying the technical idea of the present invention and does not limit the present invention. Thus, other practicable modes, examples, operation techniques, and the like which can be conceived by those skilled in the art without departing from the gist of the present invention are all included in the scope and the gist of the present invention, and are included within the scope of the claimed invention and its equivalents.

Although the drawings attached to this specification may be represented schematically by appropriately changing the scale, length-to-width ratio, shape, and the like from the actual thing for convenience of illustration and ease of understanding, the drawings are illustrative only. The drawings do not limit the interpretation of the present invention.

Note that ordinal numbers, such as "first" and "second," may be used in this specification. However, unless there is a special explanation regarding these ordinal numbers, they are added for convenience of explanation to identify constituent elements, and do not specify the number or order.

A vehicle suspension device has many constituent articles, such as a suspension structure for vehicle and a shock absorber. Examples of the suspension structure for vehicle include a suspension arm for vehicle and a suspension member for vehicle. A suspension structure for vehicle according to the present invention has at least a first plate and a second plate which are press-formed articles and has a body portion and a connecting portion to which a component for a vehicle suspension is connected. Examples of the suspension structure for vehicle include a suspension arm for vehicle and a suspension member for vehicle. An embodiment in which the suspension structure for vehicle according to the present invention is applied to a suspension arm for vehicle will be described below.

Embodiment

Figure 10:
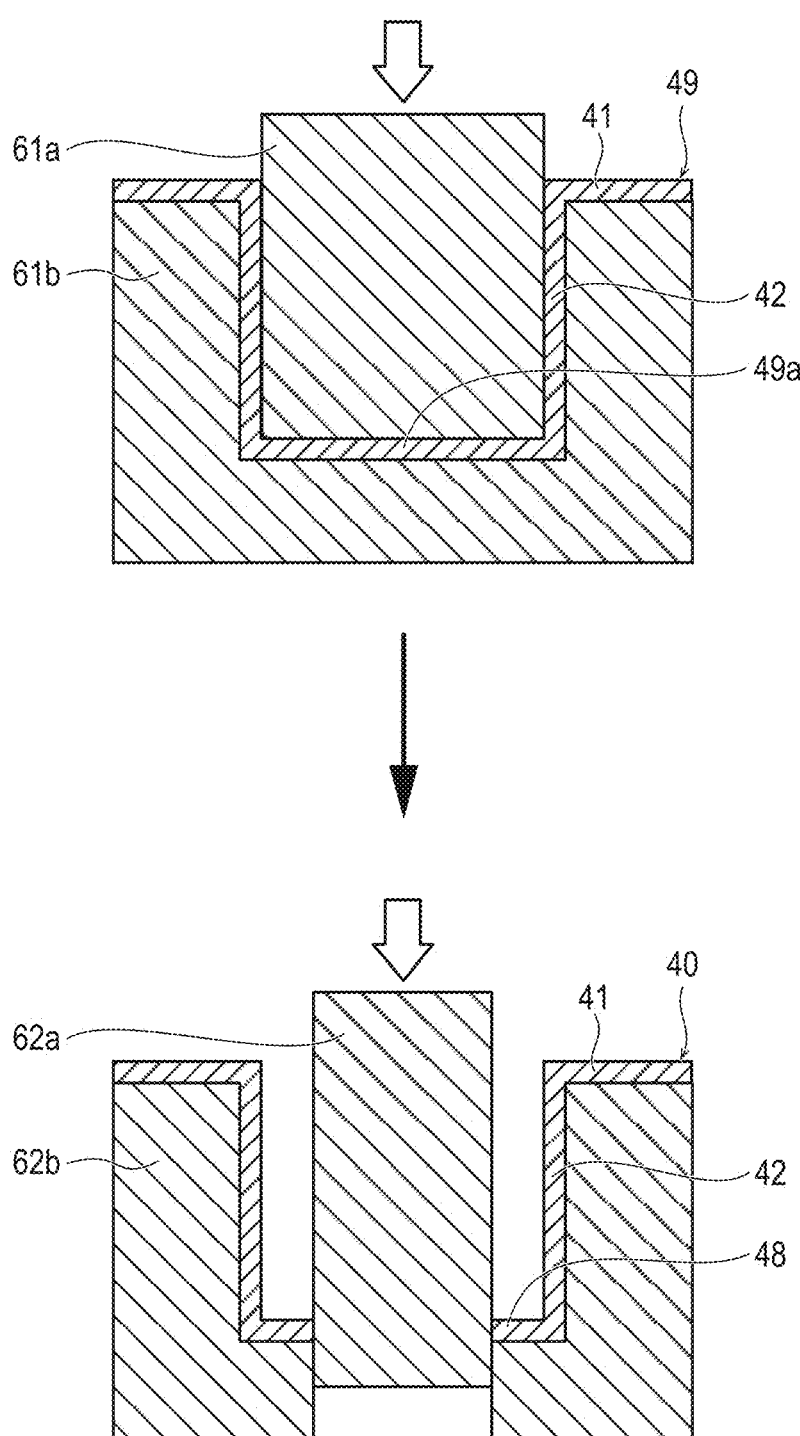
FIG. 10 is a view schematically showing a process of forming a flange portion in the first plate.
Figure 11:
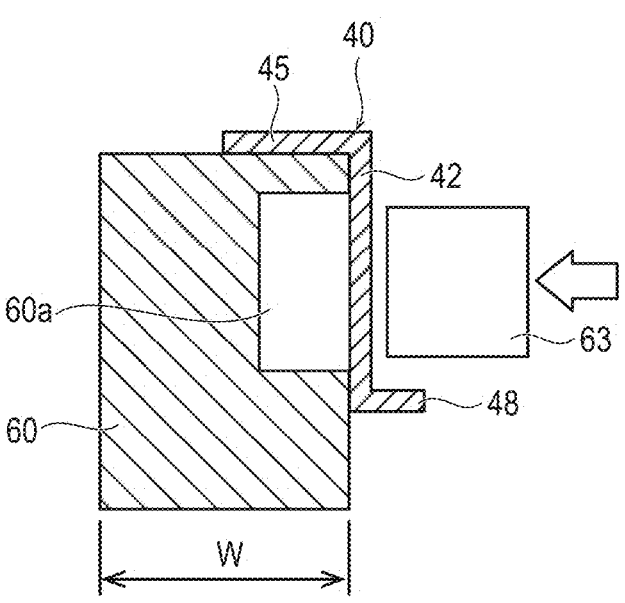
FIG. 11 is a cross-sectional view schematically showing a state where the first plate is set in a press-tool die.

A suspension arm for vehicle 11 of an embodiment will be described with reference to FIGS. 1 to 11. FIGS. 1 to 9 are views made available for explanation of configurations of portions of the suspension arm for vehicle 11 of the embodiment. FIGS. 10 and 11 are views made available for explanation of working of a first plate 40 in the suspension arm for vehicle 11.

Figure 1:
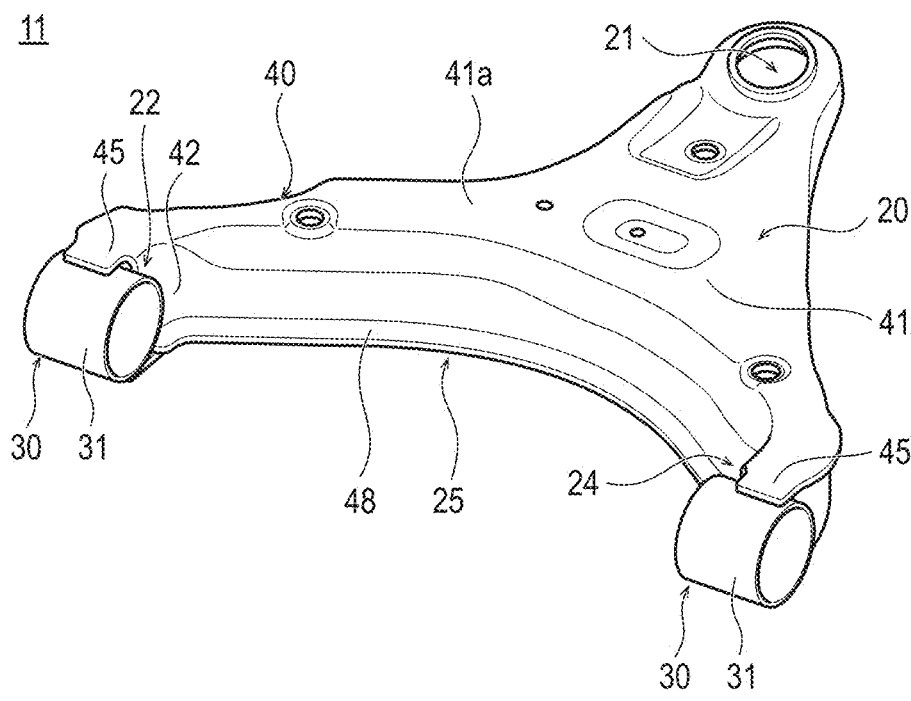
FIG. 1 is a perspective view showing a suspension arm for vehicle as a suspension structure for vehicle of an embodiment in a state where a component for a vehicle suspension is mounted thereto.
Figure 2:
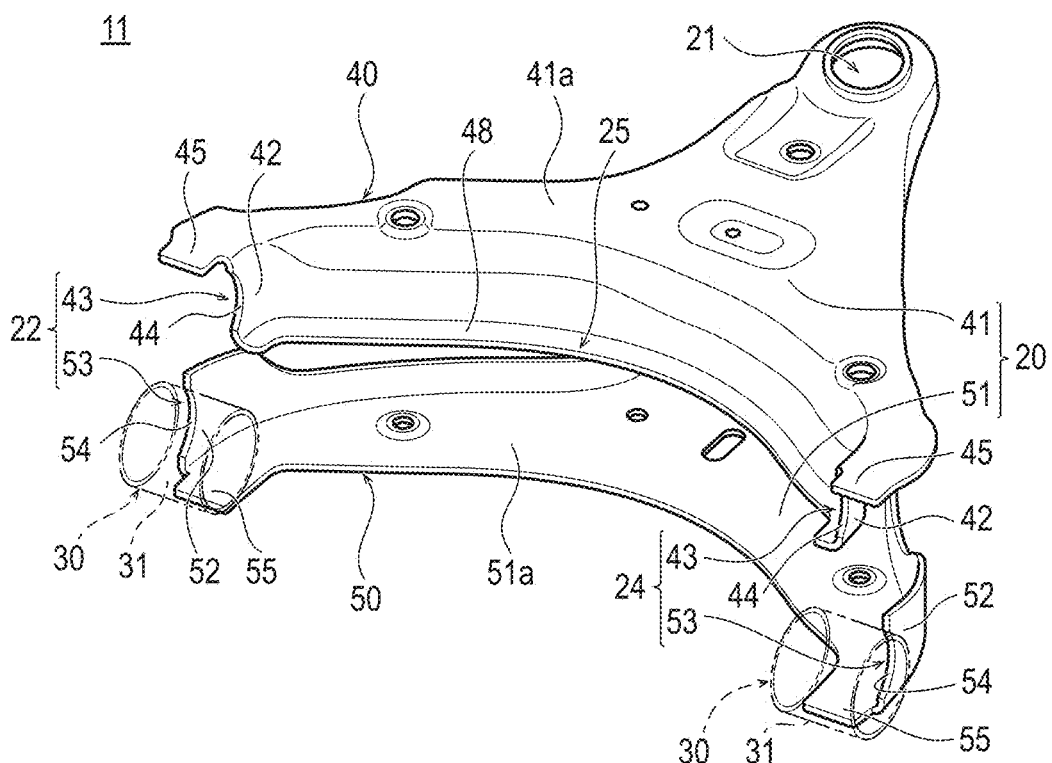
FIG. 2 is a perspective view showing the suspension arm for vehicle in a state where a first plate and a second plate are spaced apart.
Figure 3:
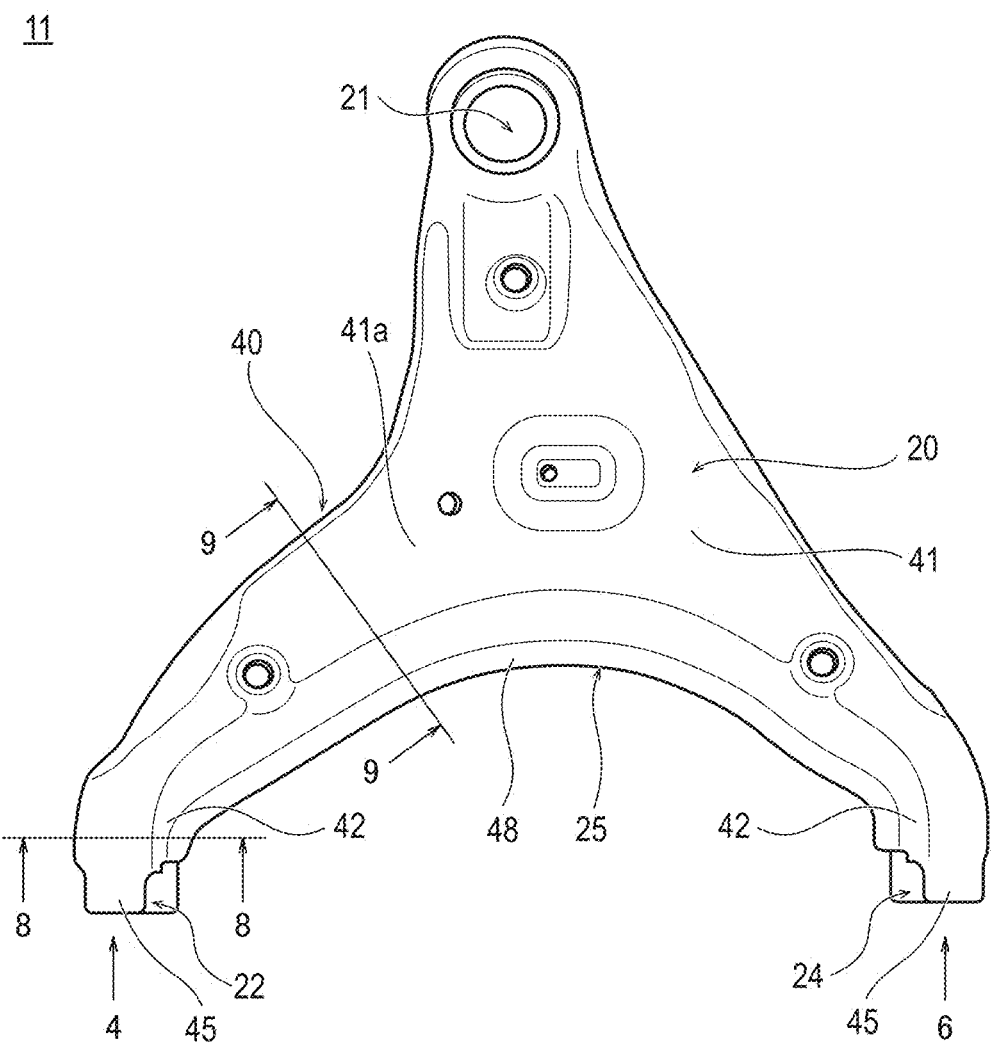
FIG. 3 is a top view showing the suspension arm for vehicle.
Figure 4:
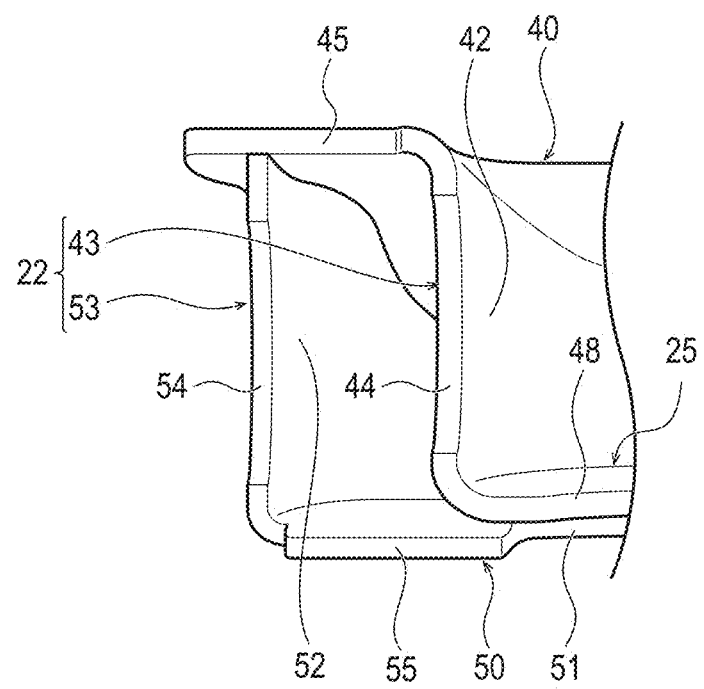
FIG. 4 is a view on arrow showing a connecting portion of the suspension arm for vehicle as viewed from a direction indicated by arrow 4 in FIG. 3.

As shown in FIGS. 1 to 3, the suspension arm for vehicle 11 (hereinafter simply referred to as the suspension arm 11) of the embodiment is used as a lower arm which is a constituent member of a double wishbone type front suspension provided in a vehicle, such as an automobile. The suspension arm 11 is mounted to a lower portion at a front of the vehicle.

As shown in FIG. 3, the suspension arm 11 has an arm body portion 20 (corresponding to a body portion) forming generally a λ-shape in plan view. In the arm body portion 20, a wheel support portion 21 is arranged at an end portion shown on an upper side in FIG. 3. The wheel support portion 21 is oscillatably connected to a wheel support member via a ball joint (the wheel support member and the ball joint are both not shown). The arm body portion 20 extends from the wheel support portion 21 so as to be divided into two left and right branches in FIG. 3. A first connecting portion 22 (corresponding to a connecting portion) to which a component 30 for a vehicle suspension is connected is arranged at an end portion on a left side in FIG. 3 in one of the two branches. A second connecting portion 24 (corresponding to a different connecting portion) to which a different component 30 for the vehicle suspension is connected is arranged at an end portion on a right side in FIG. 3 in one of the two branches. The first connecting portion 22 and the second connecting portion 24 function as a vehicle body connecting portion.

In the embodiment, the same components are used as the component 30 and the different component 30. In the embodiment, the first connecting portion 22 and the second connecting portion 24 are configured in the same manner. For this reason, members constituting the first connecting portion 22 and members constituting the second connecting portion 24 are denoted by common reference numerals.

As shown in FIGS. 1 and 2, in the embodiment, the component 30 is, for example, a metallic cylindrical member and is commonly called a collar 31. The collar 31 has the shape of a hollow cylinder, and a resin bushing (not shown) is press-fit into the collar 31. A connecting pin (not shown) is inserted in the bushing at the center thereof. Axes of the collar 31, the bushing, and the connecting pin lie, for example, along a vehicle body front-back direction. The collar 31 swingably connects the arm body portion 20 to a vehicle body.

As shown in FIGS. 1, 2, 4, 5, 6, 7, 8, and 9, the suspension arm 11 has at least the first plate 40 and a second plate 50 which are press-formed articles. The shown suspension arm 11 is formed from two plates (the first plate 40 and the second plate 50). The first plate 40 is also called an upper plate, and the second plate 50 is also called a lower plate. The first plate 40 and the second plate 50 each have generally a λ-shape in plan view. The suspension arm 11 has the arm body portion 20 that has a site having a rectangular shape (see FIG. 9) in cross-section and the first connecting portion 22 and the second connecting portion 24 that connect the components 30 for the vehicle suspension.

As shown in FIGS. 1, 2, 4, 5, 6, and 7, the first plate 40 has a first body portion 41 which constitutes the arm body portion 20, a first flat plate portion 42 which is continuous with a principal surface 41a of the first body portion 41 and is bent and extends with respect to the principal surface 41a, and a first mounting surface 43 which is formed at the first flat plate portion 42 and is to come into contact with an outer surface of the collar 31. The first plate 40 further has a flange portion 48 which is continuous with the first flat plate portion 42 and is bent with respect to the first flat plate portion 42. The first flat plate portion 42 is bent from the principal surface 41a of the first body portion 41 toward the second plate 50. The flange portion 48 is bent to extend toward outside of the principal surface 41a of the first body portion 41.

The principal surface 41a of the first body portion 41 here refers to a portion forming a nucleus of the first body portion 41 and constitutes an upper portion of the arm body portion 20 which is shown on upper sides in FIGS. 1 and 2. The word "surface" in the term "principal surface 41a" is not intended to distinctively refer to the obverse side (a surface shown on the upper sides in FIGS. 1 and 2) or the reverse side. The principal surface 41a has a slightly uneven shape to ensure rigidity of the first body portion 41. The bent first flat plate portion 42 constitutes a part of a side portion of the arm body portion 20. The expression "toward outside of the principal surface 41a of the first body portion 41" means heading in a direction toward outside of the principal surface 41a as viewed in plan view from a direction crossing the principal surface 41a of the first body portion 41, as shown in FIG. 3.

The second plate 50 has a second body portion 51 which constitutes the arm body portion 20 together with the first body portion 41 of the first plate 40, a second flat plate portion 52 which is continuous with a principal surface 51a of the second body portion 51 and is bent and extends with respect to the principal surface 51a, and a second mounting surface 53 which is formed at the second flat plate portion 52 and is to come into contact with the outer surface of the collar 31. The second flat plate portion 52 is bent from the principal surface 51a of the second body portion 51 toward the first plate 40.

The principal surface 51a of the second body portion 51 here refers to a portion forming a nucleus of the second body portion 51 and constitutes a lower portion of the arm body portion 20 which is shown on a lower side in FIG. 2. The word "surface" in the term "principal surface 51a" is not intended to distinctively refer to the obverse side (a surface shown on the upper side in FIG. 2) or the reverse side. The principal surface 51a can have a slightly uneven shape. The bent second flat plate portion 52 constitutes a part of a side portion of the arm body portion 20.

As shown in FIGS. 2, 4, 5, 6, and 7 and FIG. 11 (to be described later), a portion facing the first flat plate portion 42 in the first plate 40 is open such that the first mounting surface 43 can be formed by press working in a single state with the bent first flat plate portion 42. Similarly, a portion facing the second flat plate portion 52 in the second plate 50 is open such that the second mounting surface 53 can be formed by press working in a single state with the bent second flat plate portion 52.

The arm body portion 20 is constructed by bringing the first body portion 41 of the first plate 40 and the second body portion 51 of the second plate 50 face-to-face with each other.

The first connecting portion 22 and the second connecting portion 24 are constructed by bringing the first flat plate portion 42 of the first plate 40 and the second flat plate portion 52 of the second plate 50 face-to-face with each other with a space therebetween and spacing the first mounting surface 43 and the second mounting surface 53.

As shown in FIGS. 4, 5, 6, 7, 8, and 9, the flange portion 48 of the first plate 40 is overlaid on and bonded to the second body portion 51 of the second plate 50. The flange portion 48 is formed at the first flat plate portion 42, at which the first mounting surface 43 is formed. For this reason, rigidity of the first flat plate portion 42 can be enhanced, and the collar 31 can be firmly mounted to the first mounting surface 43.

Figure 8:
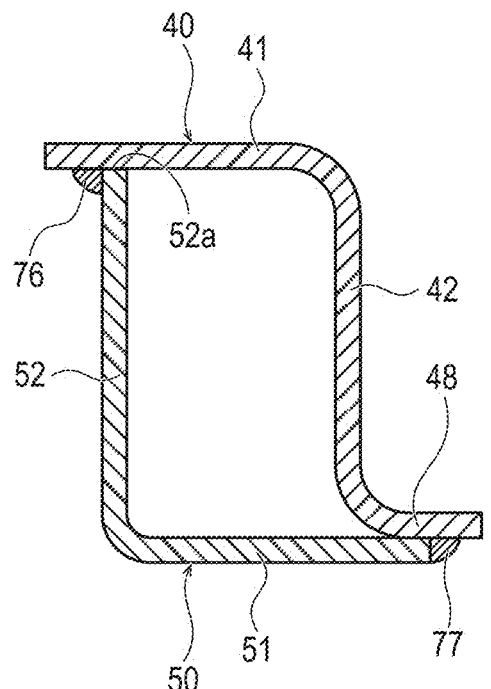
FIG. 8 is a cross-sectional view taken along line 8-8 in FIG. 3.

In the first flat plate portion 42, the first body portion 41 is arranged at one end (an upper end in FIG. 8, for example) along the direction crossing the principal surface 41a of the first body portion 41, and the flange portion 48 is arranged at the other end (a lower end in FIG. 8, for example). For this reason, the provision of the flange portion 48 does not cause a break of a welding margin for the first mounting surface 43 and the collar 31, and a relatively long welding margin can be ensured. This allows firm mounting of the collar 31 on the first mounting surface 43.

As shown in FIG. 8, the first body portion 41 of the first plate 40 is butted against an end portion 52a of the second flat plate portion 52 in the second plate 50 and is bonded to the second flat plate portion 52 along a direction in which the flange portion 48 is overlaid on the second body portion 51 of the second plate 50. Positions in an up-down direction in FIG. 8 of the first plate 40 and the second plate 50 at the time of assembly are determined by butting the first body portion 41 against the end portion 52a of the second flat plate portion 52. This facilitates positioning between the first plate 40 and the second plate 50 and improves ease of assembly.

Additionally, the first plate 40 and the second plate 50 can be assembled just by placing the first plate 40 on the second plate 50 from above. For this reason, a gap between the first plate 40 and the second plate 50 can be easily managed, and weldability improves. In the first plate 40 and the second plate 50, the flange portion 48 and the second body portion 51 can be welded from a lower side in FIG. 8, and the first body portion 41 and the second flat plate portion 52 can be welded from the lower side in FIG. 8. There is no need to invert postures of the first plate 40 and the second plate 50 and greatly change a position and a posture of a welder. This improves the weldability.

Figure 9:
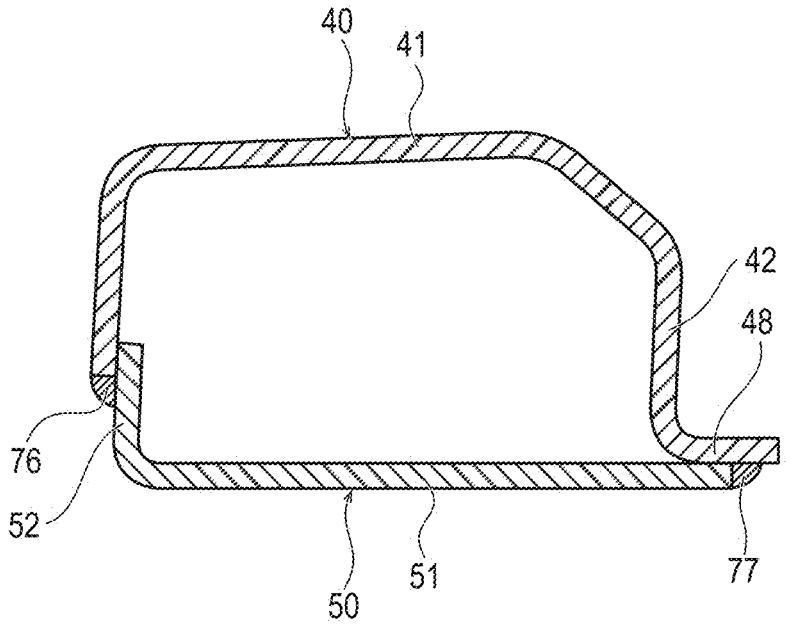
FIG. 9 is a cross-sectional view taken along line 9-9 in FIG. 3.

Note that, as shown in FIGS. 2, 8, and 9, a site at which the first body portion 41 is butted against the end portion 52a of the second flat plate portion 52 is limited to a portion close to the second mounting surface 53 in terms of enhancing rigidity of the first connecting portion 22 and the second connecting portion 24. Note that a configuration in which the whole of the end portion 52a of the second flat plate portion 52 is butted against the first body portion 41 may be adopted.

The first plate 40 and the second plate 50 are integrated together by fillet welding 76 and 77 (see FIGS. 8 and 9). Reference numerals 76 and 77 of the fillet welding 76 and 77 denote weld beads.

An angle which the first flat plate portion 42 forms with the principal surface 41a of the first body portion 41 is not particularly limited. By way of example, the first flat plate portion 42 can be bent to form an L-shape with respect to the principal surface 41a of the first body portion 41, as shown in FIGS. 4, 5, 6, 7, and 8. The expression "be bent to form an L-shape" here means being bent such that a cross-sectional shape of the first flat plate portion 42 and the principal surface 41a has generally an L-shape as viewed on a cross-section orthogonal to a line of bending between the first flat plate portion 42 and the first body portion 41, as shown in FIG. 8.

An angle which the flange portion 48 forms with the first flat plate portion 42 is not particularly limited. By way of example, the flange portion 48 can be bent to form an L-shape with respect to the first flat plate portion 42, as shown in FIGS. 4, 5, 6, 7, and 8. The expression "be bent to form an L-shape" here means being bent such that a cross-sectional shape of the flange portion 48 and the first flat plate portion 42 has generally an L-shape as viewed on a cross-section orthogonal to a line of bending between the flange portion 48 and the first flat plate portion 42, as shown in FIG. 8.

An angle which the second flat plate portion 52 forms with the principal surface 51a of the second body portion 51 is also not particularly limited. By way of example, the second flat plate portion 52 can be bent to form an L-shape with respect to the principal surface 51a of the second body portion 51, as shown in FIGS. 4, 5, 6, 7, and 8. The expression "be bent to form an L-shape" here means being bent such that a cross-sectional shape of the second flat plate portion 52 and the principal surface 51a has generally an L-shape as viewed on a cross-section orthogonal to a line of bending between the second flat plate portion 52 and the second body portion 51.

The arm body portion 20 has a curved portion 25 having a contour curved from a site with the first connecting portion 22 toward an inside of the arm body portion 20 as viewed in plan view from the direction crossing the principal surface 41a of the first body portion 41, as shown in FIG. 3. The flange portion 48 is formed at the first flat plate portion 42 that is located at the curved portion 25. For this reason, the first plate 40 can enhance rigidity (bending rigidity) of the curved portion 25 extending from the site with the first connecting portion 22. The flange portion 48, in particular, strengthens rigidity (bending rigidity) of a vicinity of the first connecting portion 22 in the curved portion 25.

The expression "from the site with the first connecting portion 22 toward an inside of the arm body portion 20" here means that a contour of the arm body portion 20 heads from the site with the first connecting portion 22 in a direction (the upper side in FIG. 3) in which the arm body portion 20 is recessed, as shown in FIG. 3.

The suspension arm 11 of the embodiment further has the second connecting portion 24 that connects the different component 30 (collar 31) in addition to the first connecting portion 22 that connects the component 30 (collar 31). The arm body portion 20 has the above-described curved portion 25 having a contour curved toward the inside of the arm body portion 20 between the first connecting portion 22 and the second connecting portion 24 as viewed in plan view from the direction crossing the principal surface 41a of the first body portion 41, as shown in FIG. 3. The flange portion 48 is formed at the first flat plate portion 42 located at the curved portion 25. In the embodiment, the curved portion 25 constitutes a site which is divided into two branches extending toward the first connecting portion 22 and the second connecting portion 24. For this reason, the first plate 40 can enhance the rigidity (bending rigidity) of the curved portion 25 that extends between the first connecting portion 22 and the second connecting portion 24. The flange portion 48, in particular, can strengthen the rigidity (bending rigidity) of the vicinity of the first connecting portion 22 and rigidity (bending rigidity) of a vicinity of the second connecting portion 24 in the curved portion 25.

As shown in FIGS. 4, 5, 6, and 7, the first mounting surface 43 is formed from a first end face 44 which is formed at an end portion of the first flat plate portion 42, and the second mounting surface 53 is formed from a second end face 54 which is formed at an end portion of the second flat plate portion 52. The collars 31 are mounted to the first connecting portion 22 and the second connecting portion 24 by fillet welding to each of the first end face 44 and the second end face 54. With this configuration, the first mounting surface 43 and the second mounting surface 53 become surfaces facing outward, and the collar 31 can be easily mounted to the first mounting surface 43 and the second mounting surface 53 by fillet welding.

Figure 5:
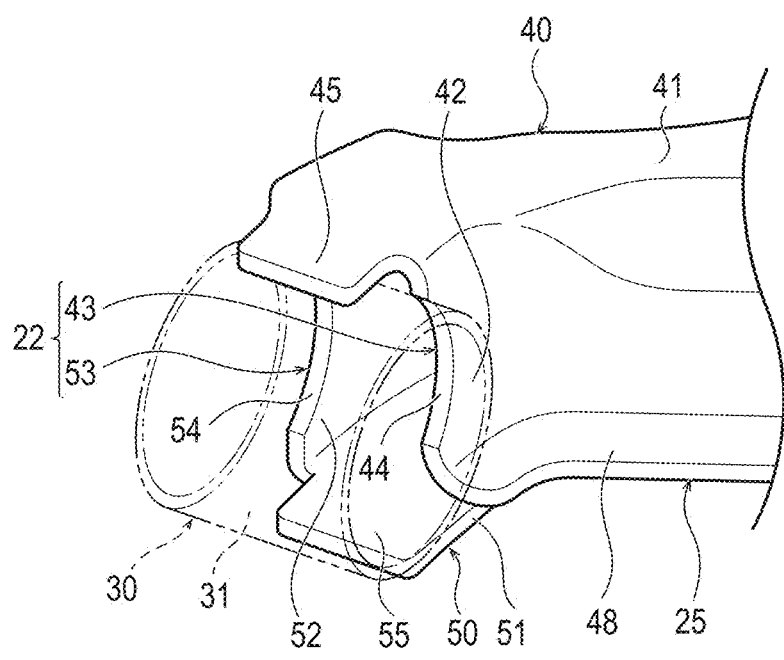
FIG. 5 is a perspective view showing a vicinity of the connecting portion of the suspension arm for vehicle.
Figure 6:
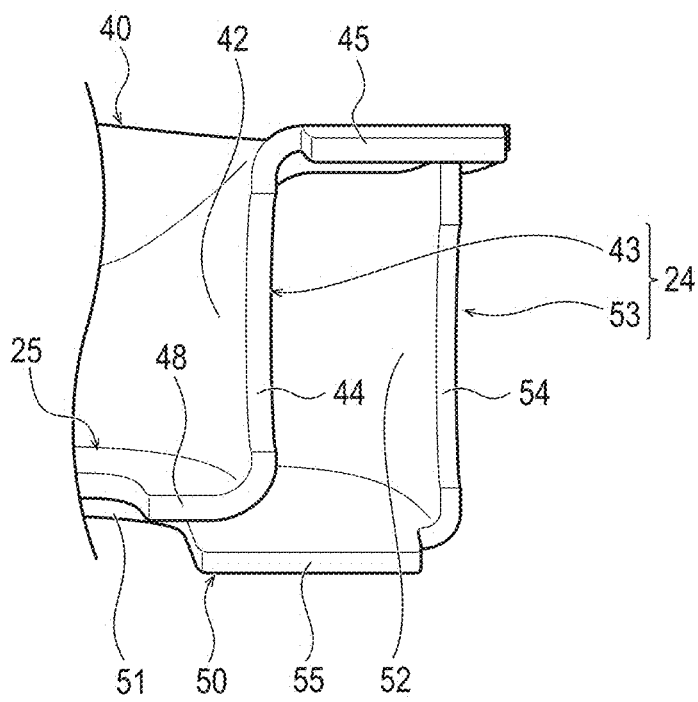
FIG. 6 is a view on arrow showing a different connecting portion of the suspension arm for vehicle as viewed from a direction indicated by arrow 6 in FIG. 3.
Figure 7:
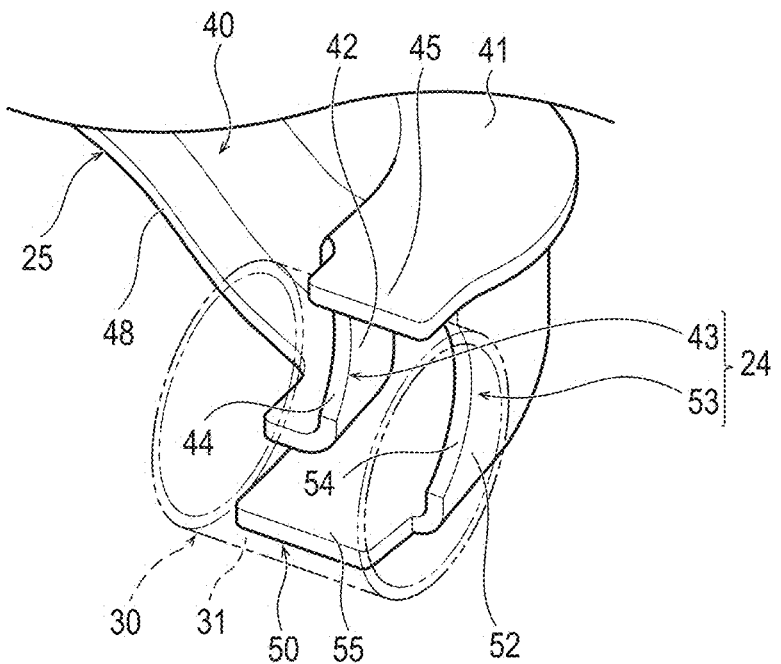
FIG. 7 is a perspective view showing a vicinity of the different connecting portion of the suspension arm for vehicle.

As shown in FIGS. 2, 5, and 7, the first plate 40 further has a first extension portion 45 which is continuous with the principal surface 41a of the first body portion 41 and extends more toward outside of the first body portion 41 than the first flat plate portion 42. The second plate 50 further has a second extension portion 55 which is continuous with the principal surface 51a of the second body portion 51 and extends more toward outside of the second body portion 51 than the second flat plate portion 52. The first extension portion 45 and the second extension portion 55 can hold the collar 31 from a direction (an up-down direction in FIGS. 5 and 7) crossing a direction (generally a left-right direction in FIGS. 5 and 7) in which the first flat plate portion 42 and the second flat plate portion 52 face each other. The collar 31 is mounted to the first connecting portion 22 and the second connecting portion 24 by fillet welding to each of an end face of the first extension portion 45 and an end face of the second extension portion 55. As a result, the component 30 (collar 31) can be more firmly mounted to the first connecting portion 22 and the second connecting portion 24.

As shown in FIG. 11, the first mounting surface 43 is formed by press-working the first plate 40 with the bent first flat plate portion 42 in a single state. A pressing device has, for example, a cam driver and a cam slider. It is possible to cut out a part of the first flat plate portion 42 by cam type press working to form the first mounting surface 43 corresponding to a shape of an outer peripheral surface of the collar 31.

Similarly, the second mounting surface 53 is formed by press-working the second plate 50 with the bent second flat plate portion 52 in a single state. It is possible to cut out a part of the second flat plate portion 52 by cam type press working to form the second mounting surface 53 corresponding to the shape of the outer peripheral surface of the collar 31.

As shown in FIG. 11, at the time of forming the first mounting surface 43, the first plate 40 with the bent first flat plate portion 42 and the bent flange portion 48 is press-worked while the first plate 40 is brought into contact with a press-tool die 60 (corresponding to a die). A width W of the press-tool die 60 is set to a width which ensures a strength sufficient to withstand a load at the time of press working. A site of the first plate 40 where the first flat plate portion 42 and the first extension portion 45 are formed has generally an L-shape in cross-section, and a portion facing the first flat plate portion 42 is open. The first plate 40 is positioned by bringing the first extension portion 45 into contact with a top surface of the press-tool die 60 and bringing the first flat plate portion 42 into contact with a side surface of the press-tool die 60. In this state, press working is performed by a punch 63, a part of the first flat plate portion 42 is removed, and the first mounting surface 43 is formed. The press-tool die 60 has a cavity portion 60a into which a distal end portion of the punch 63 can enter. The cavity portion 60a communicates with a shooter (not shown) which discharges scrapings obtained by the punch 63.

Similarly, at the time of forming the second mounting surface 53, the second plate 50 with the bent second flat plate portion 52 is press-worked while the second plate 50 is brought into contact with the press-tool die 60. A site of the second plate 50 where the second flat plate portion 52 and the second extension portion 55 are formed has generally an L-shape in cross-section, and a portion facing the second flat plate portion 52 is open. The second plate 50 is positioned by bringing the second extension portion 55 into contact with the top surface of the press-tool die 60 and bringing the second flat plate portion 52 into contact with the side surface of the press-tool die 60. In this state, press working is performed by the punch 63, a part of the second flat plate portion 52 is removed, and the second mounting surface 53 is formed.

An axial length of the collar 31 may be set relatively short due to constraints of, e.g., a vehicle body layout. In this case, a width of the first extension portion 45 may be smaller than a width of the press-tool die 60. Since a cross-section of a site which is to come into contact with the press-tool die 60 has generally an L-shape even in the case, the site with the first flat plate portion 42 and the first extension portion 45 can be brought into contact with the press-tool die 60, and the first mounting surface 43 can be formed without any problem. Similarly, even if a width of the second extension portion 55 is smaller than the width of the press-tool die 60, since a cross-section of a site which is to come into contact with the press-tool die 60 has generally an L-shape, the site with the second flat plate portion 52 and the second extension portion 55 can be brought into contact with the press-tool die 60, and the second mounting surface 53 can be formed without any problem. Thus, there is no need to form the first mounting surface 43 and the second mounting surface 53 using a laser cutting device or the like instead of press working, and an increase in manufacturing costs can be curbed.

As described above, the site of the first plate 40 where the first flat plate portion 42 and the first extension portion 45 are formed has generally an L-shape in cross-section, and the first mounting surface 43 can be formed without any problem. For this reason, the flange portion 48 can be formed as close to a root of the first mounting surface 43 as possible, as shown in FIGS. 4, 5, 6, and 7. It is thus possible to improve rigidity near the root of the first mounting surface 43 without an increase in plate thickness or reinforcement using a different component. This results in firm mounting of the collar 31 to the first mounting surface 43.

A manufacturing procedure for the suspension arm 11 will be described.

The suspension arm 11 has the first plate 40 and the second plate 50 and has the arm body portion 20 and the first connecting portion 22 and the second connecting portion 24, to which the collar 31 is to be mounted.

First, the first body portion 41 that constitutes the arm body portion 20, the first flat plate portion 42 that is continuous with the principal surface 41a of the first body portion 41 and is bent and extends with respect to the principal surface 41a, and the flange portion 48 that is continuous with the first flat plate portion 42, is bent with respect to the first flat plate portion 42, and extends toward outside of the principal surface 41a of the first body portion 41 are formed in the first plate 40.

As schematically shown in FIG. 10, a blank material 49 is first press-worked using press tools 61a and 61b, and the blank material 49 is drawn. With this process, the first body portion 41, the first flat plate portion 42, and a flexed portion 49a which is continuous with the first flat plate portion 42 and is bent with respect to the first flat plate portion 42 are formed from the blank material 49. The flexed portion 49a constitutes a bottom plate portion. After that, press working is performed by press tools 62a and 62b to trim an unnecessary portion from the flexed portion 49a. In this manner, the first body portion 41, the first flat plate portion 42, and the flange portion 48 are formed in the first plate 40.

The first mounting surface 43 that is to come into contact with the outer surface of the collar 31 is formed at the first flat plate portion 42 by press-working the first plate 40 with the bent first flat plate portion 42 while bringing the first plate 40 into contact with the press-tool die 60.

Similarly, the second body portion 51 that constitutes the arm body portion 20 together with the first body portion 41 and the second flat plate portion 52 that is continuous with the principal surface 51a of the second body portion 51 and is bent and extends with respect to the principal surface 51a are formed in the second plate 50.

The second mounting surface 53 that is to come into contact with the outer surface of the collar 31 is formed at the second flat plate portion 52 by press-working the second plate 50 with the bent second flat plate portion 52 while bringing the second plate 50 into contact with the die.

The first body portion 41 of the first plate 40 and the second body portion 51 of the second plate 50 are put into a state of being brought face-to-face with each other. Also, the first flat plate portion 42 of the first plate 40 and the second flat plate portion 52 of the second plate 50 are brought face-to-face with each other with a space therebetween, and the first mounting surface 43 and the second mounting surface 53 are put into a state of being spaced. Additionally, the flange portion 48 of the first plate 40 is put into a state of being overlaid on the second body portion 51 of the second plate 50. In this state, the first plate 40 and the second plate 50 are integrated together by weldbonding, thereby forming the arm body portion 20, the first connecting portion 22, and the second connecting portion 24.

At the time of assembly, the first body portion 41 of the first plate 40 is butted against the end portion 52a of the second flat plate portion 52 in the second plate 50 along the direction, in which the flange portion 48 is overlaid on the second body portion 51 of the second plate 50. In this state, the first body portion 41 is weld-bonded to the second flat plate portion 52.

As has been described above, the suspension arm 11 of the embodiment has the first plate 40 and the second plate 50 that are press-formed articles and has the arm body portion 20 and the first connecting portion 22 that connects the component 30 (collar 31) for the vehicle suspension. The first plate 40 has the first body portion 41 that constitutes the arm body portion 20, the first flat plate portion 42 that is continuous with the principal surface 41a of the first body portion 41 and is bent and extends with respect to the principal surface 41a, the first mounting surface 43 that is formed at the first flat plate portion 42 and is to come into contact with the outer surface of the component 30 (collar 31), and the flange portion 48 that is continuous with the first flat plate portion 42, is bent with respect to the first flat plate portion 42, and extends toward outside of the principal surface 41a of the first body portion 41. The second plate 50 has the second body portion 51 that constitutes the arm body portion 20 together with the first body portion 41 of the first plate 40, the second flat plate portion 52 that is continuous with the principal surface 51a of the second body portion 51 and is bent and extends with respect to the principal surface 51a, and the second mounting surface 53 that is formed at the second flat plate portion 52 and is to come into contact with the outer surface of the component 30 (collar 31). A portion facing the first flat plate portion 42 in the first plate 40 is open such that the first mounting surface 43 can be formed by press working in a single state with the bent first flat plate portion 42. A portion facing the second flat plate portion 52 in the second plate 50 is open such that the second mounting surface 53 can be formed by press working in a single state with the bent second flat plate portion 52. The arm body portion 20 is constructed by bringing the first body portion 41 of the first plate 40 and the second body portion 51 of the second plate 50 face-to-face with each other. The first connecting portion 22 is constructed by bringing the first flat plate portion 42 of the first plate 40 and the second flat plate portion 52 of the second plate 50 face-to-face with each other with a space therebetween and spacing the first mounting surface 43 and the second mounting surface 53. The flange portion 48 of the first plate 40 is overlaid on and bonded to the second body portion 51 of the second plate 50.

In the suspension arm 11 configured in the above-described manner, the flange portion 48 is formed at the first flat plate portion 42, at which the first mounting surface 43 is formed. For this reason, the rigidity of the first flat plate portion 42 can be enhanced, and the component 30 (collar 31) can be firmly mounted to the first mounting surface 43. A site where the flange portion 48 is formed is not a site constrained by the vehicle layout. The size and a position of the flange portion 48 can be determined without being constrained by the vehicle layout. This facilitates designing for enhancing the rigidity of the first connecting portion 22. Additionally, the rigidity of the first connecting portion 22 can be enhanced without manufacturing or welding a different component (the strut in Patent Literature 1, for example). Even if an axial length of the component 30 (collar 31) is set relatively short due to constraints of, e.g., the vehicle body layout, since cross-sections of sites including the first flat plate portion 42 and the second flat plate portion 52 each have generally an L-shape, the first mounting surface 43 and the second mounting surface 53 can be formed without any problem by press-working each of the first plate 40 and the second plate 50 in a single state. Thus, there is no need to form the first mounting surface 43 and the second mounting surface 53 using a laser cutting device or the like instead of press working, and an increase in the manufacturing costs can be curbed. This enhances the rigidity of the first connecting portion 22 without using a different component. Even if the axial length of the component 30 (collar 31) is short, it is possible to provide the suspension arm 11 that allows the first connecting portion 22, to which the component 30 (collar 31) is to be mounted, to be formed therein by using press working which is advantageous in terms of cost.

The first body portion 41 of the first plate 40 is butted against the end portion 52a of the second flat plate portion 52 in the second plate 50 along the direction, in which the flange portion 48 is overlaid on the second body portion 51 of the second plate 50 and is bonded to the second flat plate portion 52. This configuration allows easy positioning between the first plate 40 and the second plate 50 and improves ease of assembly.

The first flat plate portion 42 is bent with respect to the principal surface 41a of the first body portion 41 so as to form an L-shape, the flange portion 48 is bent with respect to the first flat plate portion 42 so as to form an L-shape, and the second flat plate portion 52 is bent with respect to the principal surface 51a of the second body portion 51 so as to form an L-shape. With this configuration, bending is performed so as to form an L-shape, which prevents complication of press working.

The arm body portion 20 has the curved portion 25 having a contour curved from the site with the first connecting portion 22 toward the inside of the arm body portion 20 as viewed in plan view from the direction crossing the principal surface 41a of the first body portion 41. The flange portion 48 is formed at the first flat plate portion 42 located at the curved portion 25. With this configuration, the first plate 40 can enhance the rigidity (bending rigidity) of the curved portion 25 extending from the site with the first connecting portion 22. The flange portion 48, in particular, can strengthen the rigidity (bending rigidity) of the vicinity of the first connecting portion 22 in the curved portion 25.

The suspension arm 11 of the embodiment further has the second connecting portion 24 that connects the different component 30 (collar 31) for the vehicle suspension. The arm body portion 20 has the curved portion 25 having a contour curved toward the inside of the arm body portion 20 between the first connecting portion 22 and the second connecting portion 24 as viewed in plan view from the direction crossing the principal surface 41a of the first body portion 41. The flange portion 48 is formed at the first flat plate portion 42 located at the curved portion 25. With this configuration, the first plate 40 can enhance the rigidity (bending rigidity) of the curved portion 25 extending between the first connecting portion 22 and the second connecting portion 24. The flange portion 48, in particular, can strengthen the rigidity (bending rigidity) of the vicinity of the first connecting portion 22 and the rigidity (bending rigidity) of the vicinity of the second connecting portion 24 in the curved portion 25. For this reason, left and right rigidity of the arm portion divided into two left and right branches with the curved portion 25 sandwiched therebetween can be improved without using a strut which is a different component.

The suspension arm 11 to be manufactured by a manufacturing method of the embodiment has the first plate 40 and the second plate 50 that are press-formed articles and has the arm body portion 20 and the first connecting portion 22, to which the component 30 (collar 31) for the vehicle suspension is to be mounted. To manufacture the suspension arm 11, the first body portion 41, the first flat plate portion 42, and the flange portion 48 are first formed in the first plate 40. The first mounting surface 43 is formed by press-working the first plate 40 with the bent first flat plate portion 42 while bringing the first plate 40 into contact with the press-tool die 60. Similarly, the second body portion 51 and the second flat plate portion 52 are formed in the second plate 50. The second mounting surface 53 is formed by press-working the second plate 50 with the bent second flat plate portion 52 while bringing the second plate 50 into contact with the press-tool die 60. The first body portion 41 of the first plate 40 and the second body portion 51 of the second plate 50 are put into a state of being brought face-to-face with each other. The first flat plate portion 42 of the first plate 40 and the second flat plate portion 52 of the second plate 50 are brought face-to-face with each other with a space therebetween, and the first mounting surface 43 and the second mounting surface 53 are put into a state of being spaced. Additionally, the first plate 40 and the second plate 50 are integrated together by weldbonding in a state where the flange portion 48 of the first plate 40 is put into a state of being overlaid on the second body portion 51 of the second plate 50, thereby forming the arm body portion 20 and the first connecting portion 22.

According to the manufacturing method configured in the above-described manner, it is possible to enhance the rigidity of the first connecting portion 22 without using a different component, and provide the suspension arm 11 that allows the first connecting portion 22, to which the component 30 (collar 31) is to be mounted, to be formed therein by using press working which is advantageous in terms of cost even if the axial length of the component 30 (collar 31) is short.

The first body portion 41 of the first plate 40 is butted against the end portion 52a of the second flat plate portion 52 in the second plate 50 along the direction, in which flange portion 48 is overlaid on the second body portion 51 of the second plate 50 and is weld-bonded to the second flat plate portion 52. This manufacture allows easy positioning between the first plate 40 and the second plate 50 and improves ease of assembly. Additionally, a gap between the first plate 40 and the second plate 50 can be easily managed, and weldability improves. Moreover, weldbonding between the flange portion 48 and the second body portion 51 and weldbonding between the first body portion 41 and the second flat plate portion 52 can each be performed from the same side. This further improves the weldability.

The first plate 40 is formed by drawing the blank material 49 to form the first body portion 41, the first flat plate portion 42, and the flexed portion 49a that is continuous with the first flat plate portion 42 and is bent with respect to the first flat plate portion 42 and then trimming an unnecessary portion from the flexed portion 49a to form the flange portion 48. With this manufacture, when the drawing is completed, a thickness of the flexed portion 49a including a portion to serve eventually as the flange portion 48 is determined. For this reason, it is possible to inhibit a crack from appearing at an end portion of the flange portion 48 more effectively than by a procedure which bends and forms the flange portion 48 after forming the first flat plate portion 42.

The first flat plate portion 42 is bent with respect to the principal surface 41a of the first body portion 41 so as to form an L-shape, the flange portion 48 is bent with respect to the first flat plate portion 42 so as to form an L-shape, and the second flat plate portion 52 is bent with respect to the principal surface 51a of the second body portion 51 so as to form an L-shape. With this manufacture, bending is performed so as to form an L-shape, which prevents complication of press working.

In the arm body portion 20, the curved portion 25 having a contour curved from the site with the first connecting portion 22 toward the inside of the arm body portion 20 is formed as viewed in plan view from the direction crossing the principal surface 41a of the first body portion 41. The flange portion 48 is formed at the first flat plate portion 42 located at the curved portion 25. With this manufacture, the first plate 40 can enhance the rigidity (bending rigidity) of the curved portion 25 extending from the site with the first connecting portion 22. The flange portion 48, in particular, can strengthen the rigidity (bending rigidity) of the vicinity of the first connecting portion 22 in the curved portion 25.

The suspension arm 11 of the embodiment further has the second connecting portion 24 that connects the different component 30 (collar 31) for the vehicle suspension. The arm body portion 20 has the curved portion 25 having a contour curved toward the inside of the arm body portion 20 between the first connecting portion 22 and the second connecting portion 24 as viewed in plan view from the direction crossing the principal surface 41a of the first body portion 41. The flange portion 48 is formed at the first flat plate portion 42 located at the curved portion 25. With this manufacture, the first plate 40 can enhance the rigidity (bending rigidity) of the curved portion 25 extending between the first connecting portion 22 and the second connecting portion 24. The flange portion 48, in particular, can strengthen the rigidity (bending rigidity) of the vicinity of the first connecting portion 22 and the rigidity (bending rigidity) of the vicinity of the second connecting portion 24 in the curved portion 25. For this reason, the left and right rigidity of the arm portion divided into two left and right branches with the curved portion 25 sandwiched therebetween can be improved without using a strut which is a different component.

Modification

The present invention is not limited to the above-described embodiment and can be appropriately altered. Although, for example, the suspension arm 11 formed from two plates (the first plate 40 and the second plate 50) has been illustrated, the suspension arm 11 can be formed from three or more plates.

Although the suspension arm 11, in which the second connecting portion 24 (the different connecting portion) has the same structure as the first connecting portion 22 (the connecting portion), has been described, the present invention is not limited to this case. The present invention can also be applied to a suspension structure for vehicle in which the structure of the second connecting portion 24 is different from the structure of the first connecting portion 22.

Although the suspension arm 11 that has the second connecting portion 24 in addition to the first connecting portion 22 has been described, the present invention is not limited to this case. The present invention can also be applied to a suspension structure for vehicle which includes only the first connecting portion 22 and does not include the second connecting portion 24.

Although a suspension structure for vehicle according to the present invention is applied to a suspension arm for vehicle in the embodiment, the present invention is not limited to this case. The suspension structure for vehicle according to the present invention can be applied to a suspension member for vehicle as long as the suspension member for vehicle has a first plate and a second plate which are press-formed articles and has a body portion and a connecting portion to which a component for a vehicle suspension is connected.

REFERENCE SIGNS LIST

11: suspension arm (suspension structure for vehicle or suspension arm for vehicle)
20: arm body portion (body portion)
21: wheel support portion
22: first connecting portion (connecting portion)
24: second connecting portion (different connecting portion)
25: curved portion
30: component for vehicle suspension
31: collar
40: first plate
41: first body portion
41a: principal surface of first body portion
42: first flat plate portion
43: first mounting surface
44: first end face
45: first extension portion
48: flange portion
49: blank material
49a: flexed portion
50: second plate
51: second body portion
51a: principal surface of second body portion
52: second flat plate portion
52a: end portion of second flat plate portion
53: second mounting surface
54: second end face
55: second extension portion
60: press-tool die
63: punch

The invention claimed is:

1. A suspension structure for vehicle comprising at least a first plate and a second plate which are press-formed articles and comprising a body portion and a connecting portion to which a component for a vehicle suspension is connected,
   wherein the first plate includes a first body portion which constitutes the body portion, a first flat plate portion which is continuous with a principal surface of the first body portion and is bent and extends with respect to the principal surface, a first mounting surface which is formed at the first flat plate portion and is to come into contact with an outer surface of the component, and a flange portion which is continuous with the first flat plate portion, is bent with respect to the first flat plate portion, and extends toward outside of the principal surface of the first body portion,
   the second plate includes a second body portion which constitutes the body portion together with the first body portion of the first plate, a second flat plate portion which is continuous with a principal surface of the second body portion and is bent and extends with respect to the principal surface, and a second mounting surface which is formed at the second flat plate portion and is to come into contact with the outer surface of the component, a portion facing the first flat plate portion in the first plate is open such that the first mounting surface is formable by press working in a single state with the bent first flat plate portion,
   a portion facing the second flat plate portion in the second plate is open such that the second mounting surface is formable by the press working in a single state with the bent second flat plate portion,
   the body portion is constructed by bringing the first body portion of the first plate and the second body portion of the second plate face-to-face with each other,
   the connecting portion is constructed by bringing the first flat plate portion of the first plate and the second flat plate portion of the second plate face-to-face with each other with a space between the first flat plate portion and the second flat plate portion and spacing the first mounting surface and the second mounting surface,
   the flange portion of the first plate is overlaid on and bonded to the second body portion of the second plate so as to extend toward outside of the principal surface of the second body portion,
   the first body portion of the first plate is butted against an end of the second flat plate portion in the second plate along a direction in which the flange portion is overlaid on the second body portion of the second plate and is bonded to the second flat plate portion, and
   the end of the second flat plate portion in the second plate is butted against an inner surface of the first body portion of the first plate, the inner surface facing the second body portion.

2. The suspension structure for vehicle according to claim 1, wherein
   the first flat plate portion is bent with respect to the principal surface of the first body portion so as to form an L-shape,
   the flange portion is bent with respect to the first flat plate portion so as to form an L-shape, and
   the second flat plate portion is bent with respect to the principal surface of the second body portion so as to form an L-shape.

3. The suspension structure for vehicle according to claim 1, wherein
   the body portion includes a curved portion having a contour curved from a site with the connecting portion toward an inside of the body portion as viewed in plain view from a direction crossing the principal surface of the first body portion, and
   the flange portion is formed at the first flat plate portion that is located at the curved portion.

4. The suspension structure for vehicle according to claim 1, further comprising
   a different connecting portion to which a different component for the vehicle suspension is connected, wherein
   the body portion includes a curved portion having a contour curved toward an inside of the body portion between the connecting portion and the different connecting portion as viewed in plain view from a direction crossing the principal surface of the first body portion, and
   the flange portion is formed at the first flat plate portion that is located at the curved portion.

5. The suspension structure for vehicle according to claim 1, wherein the suspension structure for vehicle is applied to a suspension arm for vehicle.

6. A method of manufacturing a suspension structure for vehicle including at least a first plate and a second plate which are press-formed articles and including a body portion and a connecting portion to which a component for a vehicle suspension is connected, comprising:

forming, in the first plate, a first body portion which constitutes the body portion, a first flat plate portion which is continuous with a principal surface of the first body portion and is bent and extends with respect to the principal surface, and a flange portion which is continuous with the first flat plate portion, is bent with respect to the first flat plate portion, and extends toward outside of the principal surface of the first body portion;

forming, at the first flat plate portion, a first mounting surface which is to come into contact with an outer surface of the component by press-working the first plate with the bent first flat plate portion while bringing the first plate into contact with a die;

forming, in the second plate, a second body portion which constitutes the body portion together with the first body portion of the first plate and a second flat plate portion which is continuous with a principal surface of the second body portion and is bent and extends with respect to the principal surface;

forming, at the second flat plate portion, a second mounting surface which is to come into contact with the outer surface of the component by press-working the second plate with the bent second flat plate portion while bringing the second plate into contact with the die; and forming the body portion and the connecting portion by putting the first body portion of the first plate and the second body portion of the second plate into a state of being brought face-to-face with each other, bringing the first flat plate portion of the first plate and the second flat plate portion of the second plate face-to-face with each other with a space between the first flat plate portion and the second flat plate portion, spacing the first mounting surface and the second mounting surface, and integrating together the first plate and the second plate by weldbonding in a state where the flange portion of the first plate is overlaid on the second body portion of the second plate so as to extend toward outside of the principal surface of the second body portion, wherein the first body portion of the first plate is butted against an end of the second flat plate portion in the second plate along a direction in which the flange portion is overlaid on the second body portion of the second plate and is weld-bonded to the second flat plate portion, and the end of the second flat plate portion in the second plate is butted against an inner surface of the first body portion of the first plate, the inner surface facing the second body portion.

7. The method of manufacturing the suspension structure for vehicle according to claim 6, wherein the first plate is formed by drawing a blank material to form the first body portion, the first flat plate portion, and a flexed portion which is continuous with the first flat plate portion and is bent with respect to the first flat plate portion, and then trimming an unnecessary portion from the flexed portion to form the flange portion.

8. The method of manufacturing the suspension structure for vehicle according to claim 7, wherein the first flat plate portion is bent with respect to the principal surface of the first body portion so as to form an L-shape, the flange portion is bent with respect to the first flat plate portion so as to form an L-shape, and the second flat plate portion is bent with respect to the principal surface of the second body portion so as to form an L-shape.

9. The method of manufacturing the suspension structure for vehicle according to claim 6, wherein in the body portion, a curved portion having a contour curved from a site with the connecting portion toward an inside of the body portion is formed as viewed in plain view from a direction crossing the principal surface of the first body portion, and the flange portion is formed at the first flat plate portion that is located at the curved portion.

10. The method of manufacturing the suspension structure for vehicle according to claim 6, wherein the suspension structure for vehicle further includes a different connecting portion to which a different component for the vehicle suspension is connected, in the body portion, a curved portion having a contour curved toward an inside of the body portion between the connecting portion and the different connecting portion is formed as viewed in plain view from a direction crossing the principal surface of the first body portion, and the flange portion is formed at the first flat plate portion that is located at the curved portion.

11. The method of the manufacturing suspension structure for vehicle according to claim 6, wherein the manufacturing method is applied to a suspension arm for vehicle.

12. The suspension structure for vehicle according to claim 1, wherein the first body portion is perpendicularly bonded to the second flat plate portion.

13. The method of manufacturing the suspension structure for vehicle according to claim 6, wherein the first body portion is perpendicularly bonded to the second flat plate portion.

* * * * *